United States Patent
Kawaziri et al.

[11] Patent Number: 5,929,784
[45] Date of Patent: Jul. 27, 1999

[54] DEVICE FOR DETERMINING DISTANCE BETWEEN VEHICLES

[75] Inventors: Kazuhiro Kawaziri, Miyagi; Hideo Shimizu, Kanagawa, both of Japan

[73] Assignee: Fuji Electric Co., Ltd., Kawasaki, Japan

[21] Appl. No.: 08/916,743

[22] Filed: Aug. 19, 1997

Related U.S. Application Data

[63] Continuation of application No. 08/389,929, Feb. 16, 1995, abandoned.

[30] Foreign Application Priority Data

Feb. 17, 1994 [JP] Japan .................................. 6-020065
Feb. 3, 1995 [JP] Japan .................................. 7-016602

[51] Int. Cl.⁶ .................................................. G08B 1/00
[52] U.S. Cl. ..................... 340/903; 340/435; 340/436; 340/904; 356/3; 356/14; 382/106
[58] Field of Search ...................... 340/435, 436, 340/901, 902, 903, 904; 356/3, 4, 14, 4.01, 12; 382/153, 154, 104, 106

[56] References Cited

U.S. PATENT DOCUMENTS

| | | | |
|---|---|---|---|
| 4,931,937 | 6/1990 | Kakinami et al. ................. | 364/424.01 |
| 5,307,136 | 4/1994 | Saneyoshi ................................... | 356/1 |
| 5,309,137 | 5/1994 | Kajiwara .................................. | 340/436 |
| 5,379,353 | 1/1995 | Hasegawa et al. ...................... | 382/104 |
| 5,487,116 | 1/1996 | Nakano et al. .......................... | 382/104 |

FOREIGN PATENT DOCUMENTS 63-142478  6/1988  Japan .
 5020593  1/1993  Japan .

*Primary Examiner*—Edward Lefkowitz
*Attorney, Agent, or Firm*—Greer, Burns, & Crain, Ltd.

[57] ABSTRACT

A device for determining the distance between vehicles according to this invention is used with a vehicle for determining the distance to a vehicle ahead of the device-equipped vehicle moving on a traffic lane defined by lines drawn on a road. The device comprises a pair of light receivers each having at least one light sensor array, a line detector for detecting images at points at which the quantity of light takes maximum values on the light sensor array of at least one of the light receivers as the lines and providing an output signal representing the positions of the lines, a measuring range detector responsive to the output signal of the line detector for detecting a range of the traffic lane on which the device-equipped vehicle is moving; and a distance detector for determining the distance to the vehicle ahead on the basis of positions where an image of the vehicle ahead is formed on the light sensor array within the range of the traffic lane detected by the measuring range detector.

19 Claims, 14 Drawing Sheets

DEVICE FOR DETERMINING DISTANCE BETWEEN VEHICLES

This application is a continuation of application Ser. No. 08/389,929 filed on Feb. 16, 1995 now abandoned.

BACKGROUND OF THE INVENTION

1. Field of the Invention

The present invention relates to a device for determining the distance between vehicles, using light sensors with light sensor arrays.

2. Description of the Related Art

As an example of a device for determining the distance between vehicles, there is known a device which electrically compares images formed by two right and left optical systems and then determines the distance between moving vehicles using the principle of triangulation. FIG. 12 shows an arrangement of a conventional device for measuring the distance between moving vehicles. In this device, imaging lenses 1 and 2 are disposed with their optical axes separated a distance B, and light sensor arrays 3A and 4A, each of which is a CCD linear array sensor, are spaced from the respective imaging lenses 1 and 2 by their focal length f. The light sensor arrays 3A and 4A output image signals 30A and 40A that represent images formed on the respective sensor arrays to a signal processor 5, which comprises amplifiers 51 and 52, analog-to-digital (A/D) converters 53 and 54, and a storage device 55. The image signals 30A and 40A are amplified by the amplifiers 51 and 52, converted into digital data by the A/D converters 53 and 54, and then stored in the storage device 55 as image data 31A and 41A. A distance detector 7, which is a microprocessor-based circuit, compares the right and left image data 31A and 41A stored in the storage device 55 to calculate the distance to the object and then outputs a distance signal 10 to the outside.

The principle of distance calculation will be described next with reference to FIG. 13. Take X-axis and the Y-axis, respectively as the axis of abscissa and the axis of ordinate, with the origin O at the middle point between the imaging lenses 1 and 2. Next, let the coordinates of position L1 where the image of object 11A is formed on the light sensor array 3A be $(-a_{L1}-B/2, -f)$ and let the coordinates of position $R_1$ where the object image is formed on the right light sensor array 4A be $(a_{R1}+B/2, -f)$. The coordinates of the center $O_L$ of the lens 1 are $(-B/2, 0)$ and the coordinates of the center $O_R$ of the lens 2 is $(B/2, 0)$. Assume the coordinates of a point M on the object 11A are $(x, y)$. Then, the coordinates of the point N at which the perpendicular dropped from the point M onto the X-axis and the X-axis intersect will be $(x, 0)$. The coordinates of the foot $L_0$ of the perpendicular dropped from the point $O_L$ onto the sensor array 3A are $(-B/2, -f)$, and the coordinates of the foot $R_0$ of the perpendicular dropped from the point $O_R$ onto the sensor array 4A are $(B/2, -f)$. Note here that, in the figure, $a_{L1}$ represents the distance between points $L_0$ and $L_1$, and $a_{R1}$ represents the distance between points $R_0$ and $R_1$. Since triangles $MO_L N$ and $O_L L_1 L_0$ are similar and triangles $MO_R N$ and $O_R R_1 R_0$ are similar, the following equations will hold:

$$(x+B/2)\cdot f = a_{L1}\cdot y \quad (1)$$

$$(x-B/2)\cdot f = a_{R1}\cdot y \quad (2)$$

From equations (1) and (2) the following equation is obtained:

$$y = B\cdot f/(a_{L1}+a_{R1}) \quad (3)$$

If, therefore, the values of $a_{L1}$ (the distance between left image location $L_1$ and point $L_0$) and $a_{R1}$ (the distance between right image location $R_1$ and point $R_0$) are known, then the distance y to the object 11A can be determined.

Next, the operation of the distance detector 7 will be described with reference to FIGS. 14 and 15. FIG. 14 illustrates the left image data 31A output from the A/D converter 53 and the right image data 41A output from the A/D converter 54. FIG. 15 is a schematic representation of a normal image at the time of detection of the distance to a vehicle 11 ahead. The distance detector 7 sets a measuring range 9 within the field of view as shown in FIG. 15 and compares the left and right image data 31A and 41A within this measuring range. When the comparison shows no match between the right and left images, the left image data 31A is shifted to the right and the right image data 41A is shifted to the left, as shown by broken lines in FIG. 14, to obtain the amounts of shift when the image match occurs. The distance $a_{L1}$ between the left image location $L_1$ and the point $L_0$ corresponds to the amount of shift of the left image and the distance $a_{R1}$ between the right image location $R_1$ and the point $R_0$ corresponds to the amount of shift of the right image. The distance detector 7 is thus allowed to calculate the distance to the object 11A (a vehicle 11 ahead) from equation (3) using the shift amounts $a_{L1}$ and $a_{R1}$.

In the prior art, however, problems arise in the following cases. FIG. 16 illustrates an abnormal image at the time of detection of the distance to the vehicle 11 ahead. At the vehicle interval detection time, as shown in FIG. 16, a part of the vehicle 11 ahead may go out of the measuring range 9 when the leading vehicle 11 or the trailing vehicle (distance measuring vehicle) strays from the center or when they are moving on a curved path. Alternatively, a part of the leading vehicle 11 and a part of a vehicle 13 moving on another traffic lane may appear simultaneously within the same measuring range 9. In either case, not only will unstable and inaccurate measurement be made, but the measurement itself will become meaningless.

To solve this problem, an automatic tracking system may be used which holds the measuring range locked on the vehicle ahead all the time. However, this automatic tracking system requires a long time for image processing for tracking. For this reason, except when the leading vehicle is moving at a constant speed, the system cannot generally measure the distance to the vehicle ahead, which varies according to its speed. This problem could be solved technically by using a high-speed image processing technique. However, this would inevitably increase the size and cost of the device. It is thus almost impossible to implement the automatic tracking system.

SUMMARY OF THE INVENTION

It is an object of the present invention to provide a device which determines the distance to a vehicle ahead in an easy, stable and accurate manner using light receivers having light sensor arrays.

According to the present invention there is provided a device, used with a vehicle, for determining the distance to a vehicle ahead, the leading and trailing vehicles moving on the same traffic lane defined by a line drawn on a road, comprising: a pair of light receivers each having at least one light sensor array; line detecting means for determining a line drawn on a road by detecting on said light sensor array of at least one of said points at which the quantity of light receivers, light takes maximum values and providing an output signal representing the position of said line; measuring range detecting means responsive to said output signal of said line detecting means for detecting a range of said traffic lane on which said trailing vehicle is moving; and distance detecting means for determining the distance to said vehicle ahead on the basis of a position where an image of said vehicle ahead is formed on said light sensor array within said range of said traffic lane detected by said measuring range detecting means.

The line detecting means may detect an image on the line only when it is maintained within a predetermined range for a predetermined length of time.

At least one of the light receivers may comprise at least first, second and third light sensor arrays, and, when a straight line that connects one of the points of maximum value in the distribution of quantity of light on the first light sensor array and one of the points of maximum value in the distribution of quantity of light on the second light sensor array, passes within a predetermined range, centered at one of the points of maximum value in the distribution of the quantity of light on the third light sensor array, the line detecting means may detect an image corresponding to the straight line as one of the lines.

The line detecting means may determine the distance to an object using a position of a maximum value in the distribution of quantity of light on the light sensor array of the light receivers and a width of an image of the object on the light sensor array and may detect the line using the distance to the object and the width of the image of the object.

The line detecting means may determine the width of the object by using the distance to the object and the width of the image of the object, and detect the object as the line when the width of the object is smaller than a predetermined width.

The line may be a white line.

The measuring range detecting means may determine the width of the traffic lane on the basis of the line closest to the light sensor arrays among lines detected by the line detecting means.

In the invention, an image at a point at which the quantity of light takes its maximum value on the sensor array of at least one of the light receivers is detected by the line detecting means as a traffic-lane-defining line. Next, a measurable range for a vehicle ahead is detected by the measuring range detecting means on the basis of an output signal of the line detecting means that represents the position of the line. Finally, the distance to a vehicle ahead is calculated by the distance detecting means on the basis of triangulation using an image of the vehicle ahead within the detected measurable range.

Line detecting methods include the following methods. The first method detects an image at a point at which the quantity of light takes a maximum value as a line only when it is maintained within a set range for a set time. The second method detects a straight line that connects points of maximum value in the distribution of the quantity of light in two sensor arrays in each of the light receivers passes within a range centered at a point of a maximum value in the quantity of light on the other sensor array as a line. The third method detects an object, whose image is formed at a point of maximum value of the quantity of light, as a line when the width of the object obtained using the distance to the object obtained from the position of the maximum-value point and the width of the image falls within a set range.

DESCRIPTION OF THE PREFERRED EMBODIMENT

Figure 1:
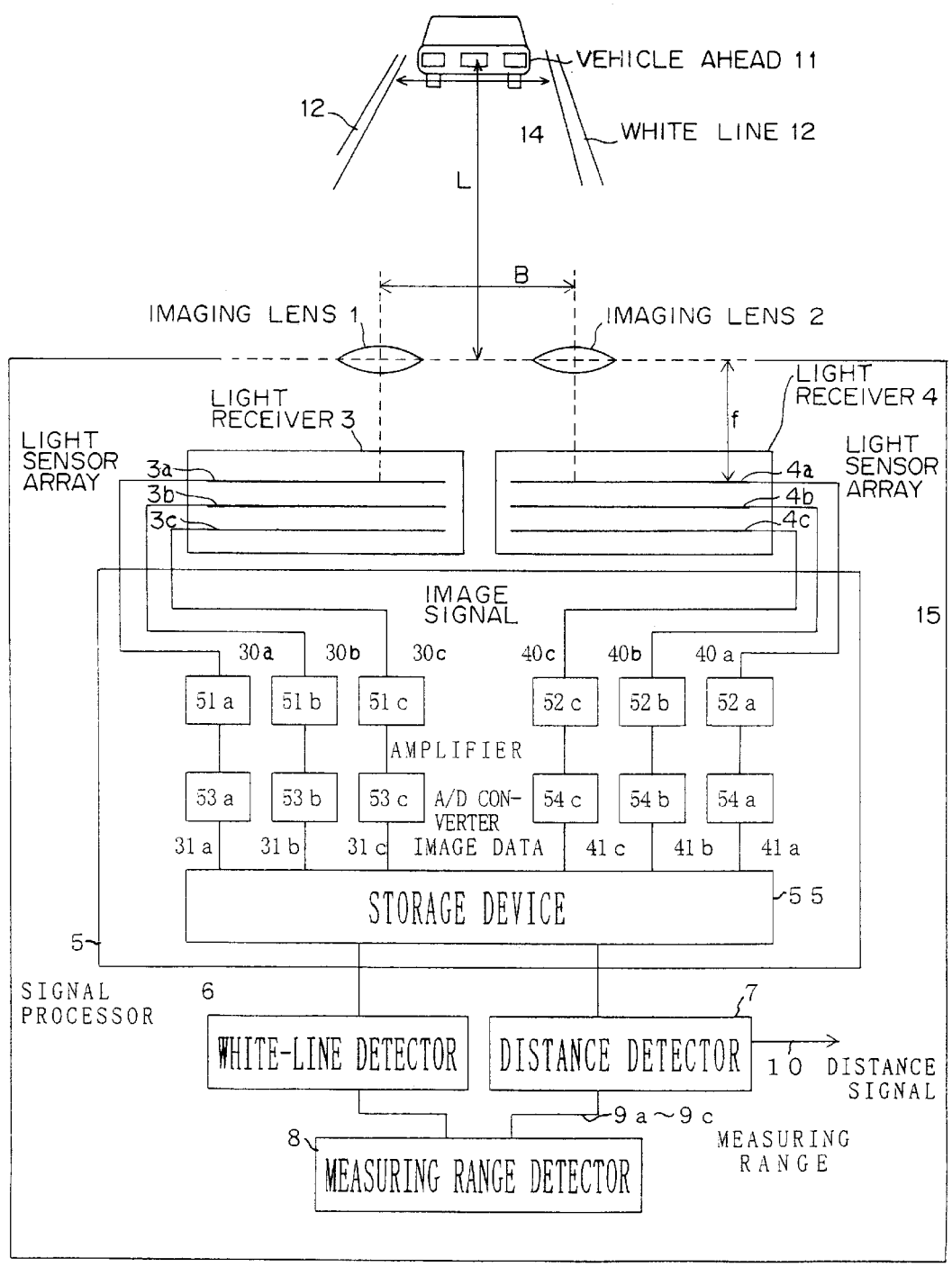
FIG. 1 is a block diagram of a vehicle interval measuring device embodying the present invention.

Referring now to FIG. 1, there is illustrated an arrangement of a vehicle interval detecting device embodying the invention. In this figure, a vehicle 10 is moving ahead of a vehicle 15 at an interval L in the same traffic lane 14, the trailing vehicle 15 being equipped with the vehicle interval detecting device of the present invention.

The present embodiment includes imaging lenses 1 and 2 each having a focal distance of f and light receivers 3 and 4 which are placed the focal distance f away from the respective lenses 1 and 2, respectively. The lenses 1 and 2 are placed with their optical axes spaced a distance B apart. The light receiver 3 has three light sensor arrays 3a, 3b and 3c arranged parallel to a plane that is perpendicular to the optical axis of the lens 3. Likewise, the light receiver 4 has three light sensor arrays 4a, 4b and 4c arranged parallel to a plane perpendicular to the optical axis of the lens 4. The paired sensor arrays 3a and 4a, 3b and 4b, and 3c and 4c are placed in parallel along the direction of their arrays so that they have the same field of view. Images of objects, such as the car 11 ahead, white lines 12, etc., formed by the lens 1 are converted into image signals 30a, 30b and 30c, by the respective sensor arrays 3a, 3b and 3c. Likewise, images of the same objects formed by the lens 2 are converted into image signals 40a, 40b and 40c by the respective sensor arrays 4a, 4b and 4c. These image signals are fed into a signal processor 5, which is one of constituent elements of the present embodiment.

The signal processor 5 comprises amplifiers 51a, 51b, 51c, 52a, 52b and 52c, A/D converters 53a, 53b, 53c, 54a, 54b and 54d, and a storage device 55. The image signals 30a, 30b and 30c output from the respective light sensor arrays 3a, 3b and 3c are amplified by the respective amplifiers 51a, 51b and 51c, converted into digital data by the respective A/D converters 53a, 53b and 53c, and then read into the storage device 55 as image data 31a, 31b and 31c. Likewise, the image signals 40a, 40b and 40c output from the respective light sensor arrays 4a, 4b and 4c are amplified by the respective amplifiers 52a, 52b and 52c, converted into digital data by the respective A/D converters 54a, 54b and 54c, and then read into the storage device 55 as image data 41a, 41b and 41c.

The present embodiment further comprises a distance detector 7 for measuring the distance to objects, a white-line detector 6 for detecting white lines drawn on roads, and a measuring range detector 8 for determining distance measuring ranges 9a, 9b and 9c, by the use of the image data.

The distance detector 7 has a built-in microcomputer and measures the distance to an object on the basis of locations where an object image is formed on the light sensor arrays. More specifically, the distance detector 7 calculates the distance to an object within the measuring range 9a, 9b and/or 9c in the field of view of the light sensor arrays 3a and 4a, 3b and 4b, and/or 3c and 4c by the use of left and right image data 31a and 41a, 31b and 41b, and/or 31c and 41c. This distance calculation is made on the basis of the above-described principle of distance calculation. A method of determining the measuring ranges 9a, 9b and 9c will be described later.

The white-line detector 6, which is also a microcomputer-based circuit, detects white lines 12 that define a traffic lane 14 on which the vehicle 15 equipped with the distance measuring device of the invention is moving. In detecting the white lines, the detector 6 recognizes images at points at which the quantity of light take maximum values (maximum points in distribution of light) on the sensor arrays of at least one of the light receivers 3 and 4 as white lines 12.

Figure 2A:
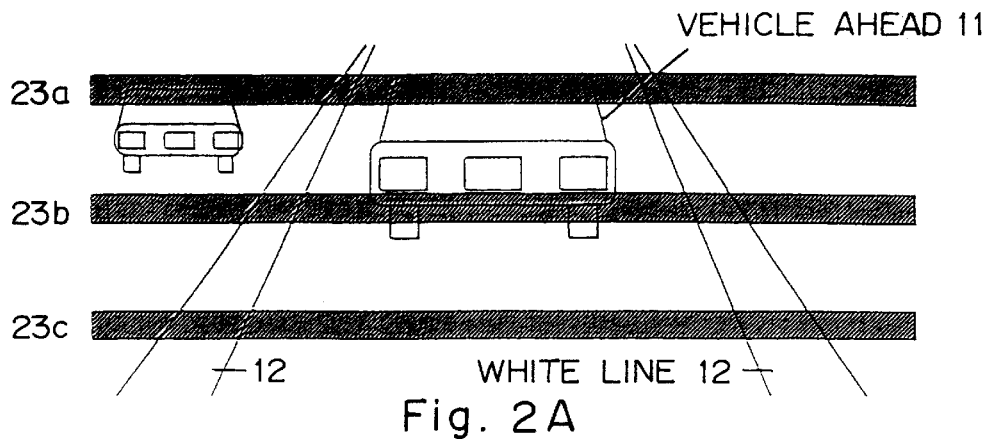
FIG. 2A is a schematic representation of a field-of-view image which is used to explain a method of detecting points of maximum values required to detect white lines which define traffic lanes.
Figure 2B:
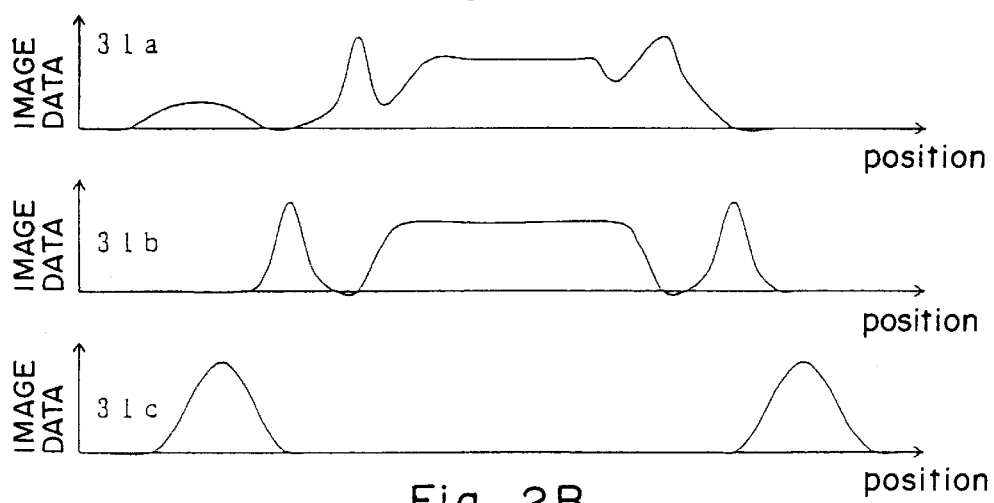
FIG. 2B illustrates image data.
Figure 2C:
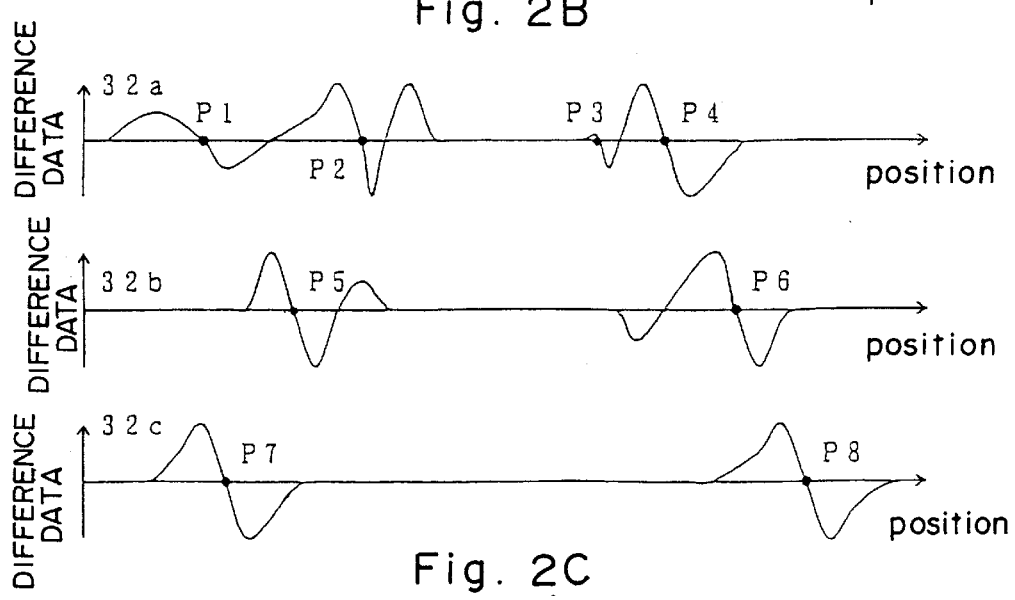
FIG. 2C illustrates difference data.

FIGS. 2A, 2B and 2C illustrate a method of detecting points of maximum value required to detect white lines. The light sensor arrays 3a, 3b and 3c of the left light receiver 3 have fields of view indicated by respective portions 23a, 23b and 23c shown in cross-hatching in FIG. 2A. Images in the respective fields of view 23a, 23b and 23c are converted into such image data 31a, 31b and 31c as shown in FIG. 2B and then stored in the storage device 55. The white-line detector 6 receives the image data 31a, 31b and 31c from the storage device 55 and calculates the difference in data value between two successive pixels in each sensor array along its longitudinal line, thereby obtaining such difference data 32a, 32b and 32c as shown in FIG. 2C. Next, the white-line detector detects zero points at which the data value changes from positive to negative from the difference data 32a, 32b and 32c and stores positions P1 to P8 of pixels at the zero points as points of maximum values. There are three methods of detecting white lines from these points P1 to P8 of maximum value, which will be described below. The white-line detecting methods described herein are applied to the inputs from the left light receiver 3, but the same methods can be applied to the inputs from the right light receiver 4.

Figure 3:
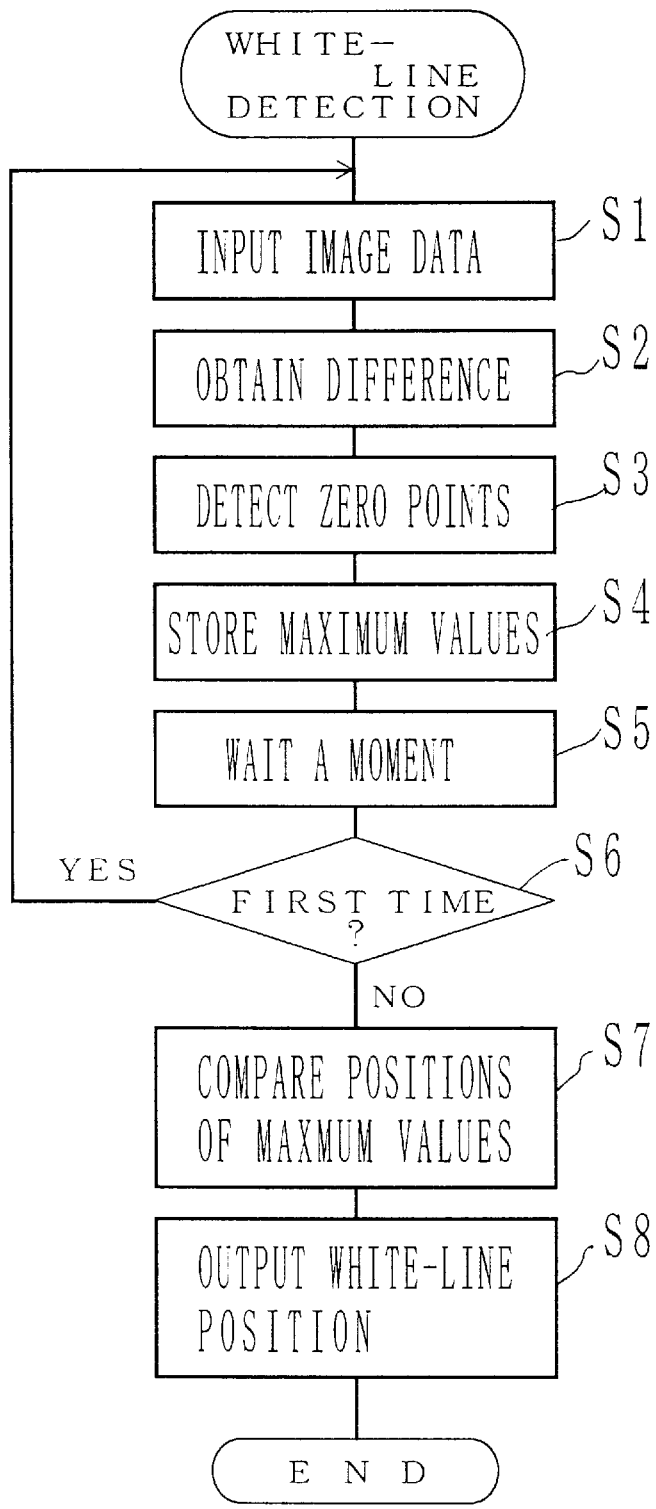
FIG. 3 is a flowchart for the operation of the white-line detector of FIG. 1 using a first white-line detecting method.
Figure 4:
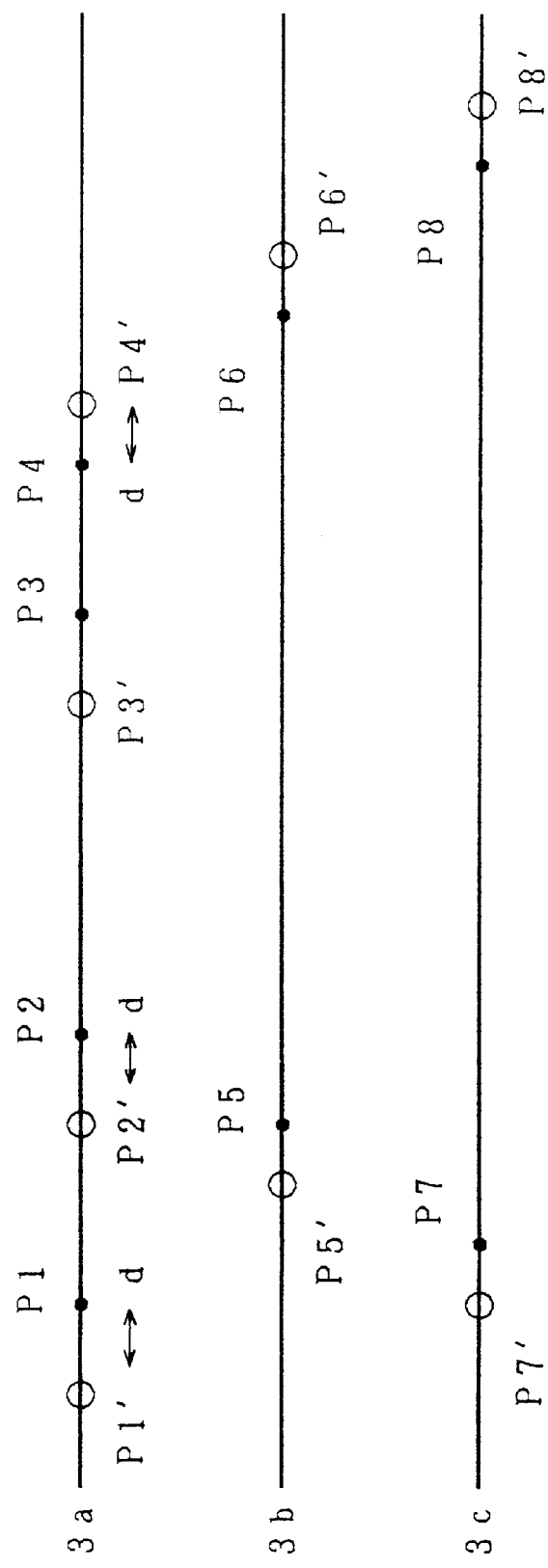
FIG. 4 illustrates detection signals by the first white-line detecting method.

A first white-line detecting method will be described with reference to FIGS. 3 and 4. FIG. 3 is a flowchart for the operation of the white-line detector 6 according to the first method, and FIG. 4 represents points P1 to P8 of maximum values on the light sensor arrays 3a, 3b and 3c in the first method.

First, the white-line detector 6 of FIG. 1 receives the image data 31a, 31b and 31c (step S1), obtains the difference data 32a, 32b and 32c (step S2), detects zero points in the difference data 32a, 32b and 32c (step S3), and then detects and stores the points P1 to P8 of maximum values (step S4). After that, the detector 6 is placed in the wait state for a predetermined time t (step S5) and then repeats steps S1 to S5 a predetermined number of times. Next, the white-line detector 6 compares each of points P1' to P8' of maximum values detected on a second time or thereafter with a respective one of the points P1 to P8 of maximum value stored in the storage device and obtains differences in position of those points as shown in FIG. 4 (step S7). When the differences in position of the points are smaller than a preset value d, the detector 6 recognizes corresponding maximum-value points as positions of white lines, and then provides corresponding position information to the measuring range detector 8 (step S8). Of the points P1 to P8 shown in FIG. 4, only the points P4 to P8 are recognized as positions of white lines.

Figure 5:
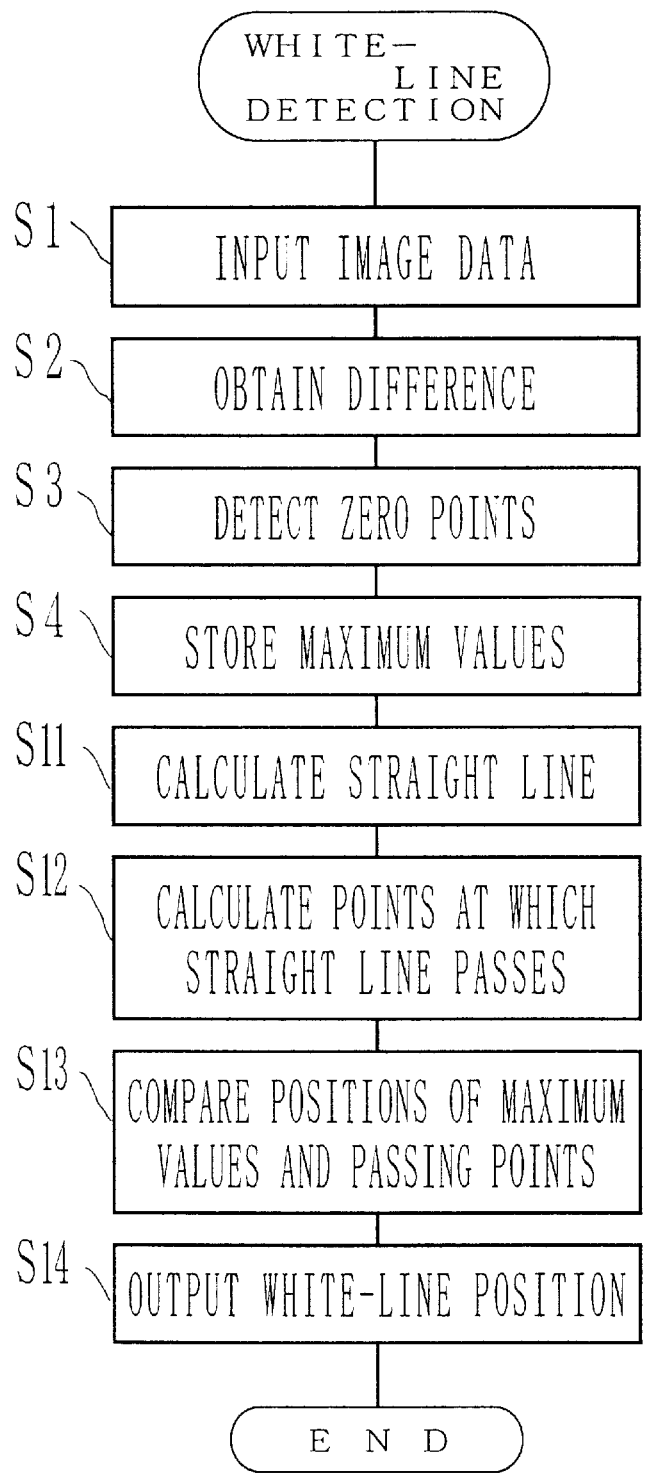
FIG. 5 is a flowchart for the operation of the white-line detector based on a second white-line detecting method.
Figure 6:
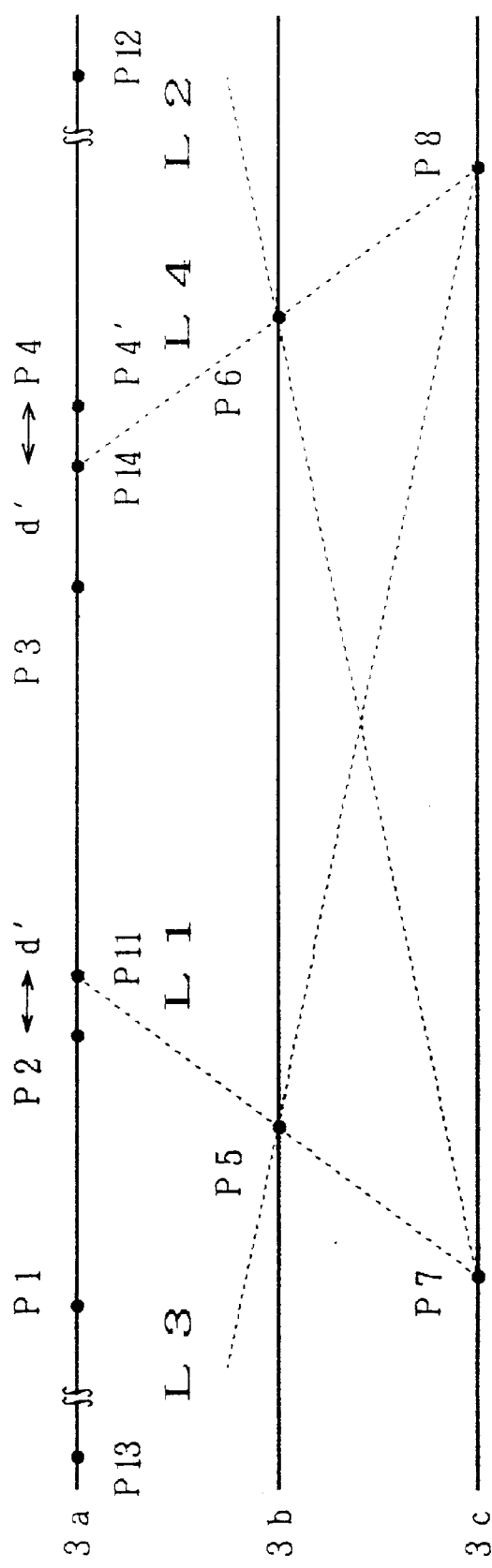
FIG. 6 illustrates detection signals by the second white-line detecting method.

Next, a second white-line detecting method will be described with reference to FIGS. 5 and 6. FIG. 5 is a flowchart of the operation of the white-line detector 6 according to the second method, and FIG. 6 represents points of maximum values on the respective light sensor arrays 3a, 3b and 3c in the second method.

In the second method, the white-line detector 6 obtains points of maximum value from the image data (steps S1 to S4) like the first method and then obtains straight lines L1 to L4 each of which connects a maximum-value point on one of two light sensor arrays (for example, 3b and 3c) with a maximum-value point on the other light sensor array (step S11). In FIG. 6, L1 represents a straight line connecting P7 on the sensor array 3c with P5 on the sensor array 3b, L2 represents a straight line connecting P7 with P6 on the sensor array 3b, L3 represents a straight line connecting P8 on the sensor array 3c with P5, and L4 represents a straight line connecting P8 with P6. Next, the white-line detector 6 obtains points P11, P12, P13 and P14 on the remaining light sensor array (for example, 3a) with which the straight lines L1 to L4 intersect (step S12), compares each of the points P11 to P14 with the points P1 to P4 of maximum values on the light sensor array 3a which are detected from the image data for that sensor array (step S13), detects straight lines that pass within a predetermined range d' centered on the maximum point on the remaining light sensor array, and then outputs the points of maximum value corresponding to the straight lines thus detected as the position of white lines (step S14). Of the straight lines shown in FIG. 6, the straight lines L1 and L4 are detected, and the maximum-value points P2, P4, P5, P6, P7 and P8 on these straight lines L1 and L4 are recognized as white-line positions and output to the measuring range detector 8.

Figure 7:
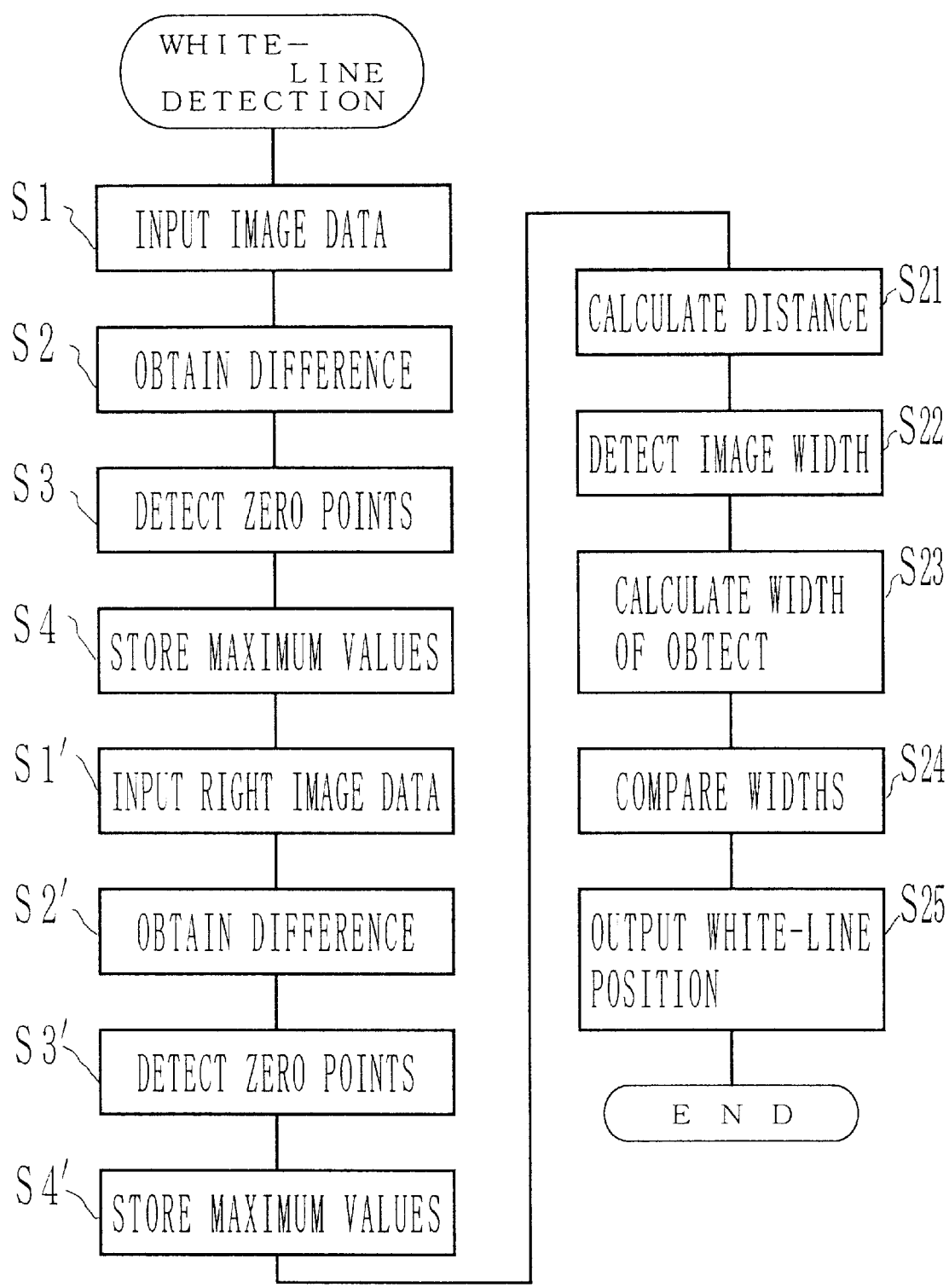
FIG. 7 is a flowchart for the operation of the white-line detector based on a third white-line detecting method.
Figure 8:
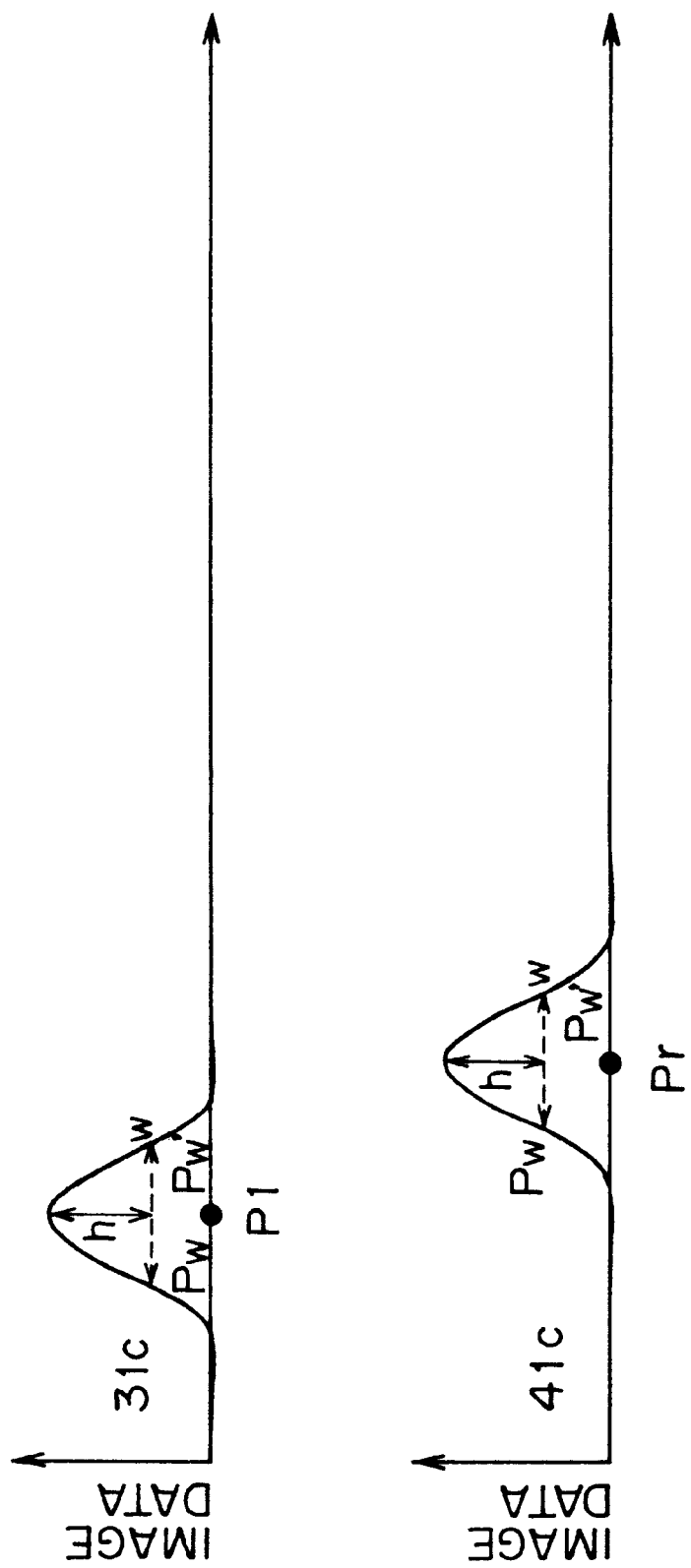
FIG. 8 illustrates detection signals by the third white-line detecting method.

A third white-line detecting method will be described with reference to FIGS. 7, 8 and 9. FIG. 7 is a flowchart for the operation of the white-line detector 6 according to the third method, FIG. 8 illustrates image data by the third method, and FIG. 9 illustrates the principle of detection of the width of an object.

In the third method, the white-line detector 6 detects a point (e.g., P1) of the maximum value from left image data (e.g., 31c) in the same way as steps S1 to S4 described in connection with the first and second methods, and also detects a point (Pr) of the maximum value from right image data (e.g., 41c) corresponding to that left image data in steps S'1 to S'4 each corresponding to a respective one of steps S1 to S4.

Next, the white-line detector 6 calculates the distance S to an object associated with the maximum values from the maximum-value points Pl and Pr in the left and right image data 31c and 41c on the basis of the above-described principle of distance detection (step S21). The white-line detector 6 also calculates the width w of the image of the object associated with the maximum value Pl or Pr using the image data 31c or 41c (step S22). In this calculation, the width w of the image can be determined by points (Pw and P'w) on each side of the maximum Pl or Pr of image data at which the data value is a predetermined value h lower than the peak value (as an example, h is selected as ½ the peak value). The width w may also be obtained by the product of the sensor pitch and the number of sensors on each side of the peak point that output values of, say, not less than half the peak value.

Figure 9:
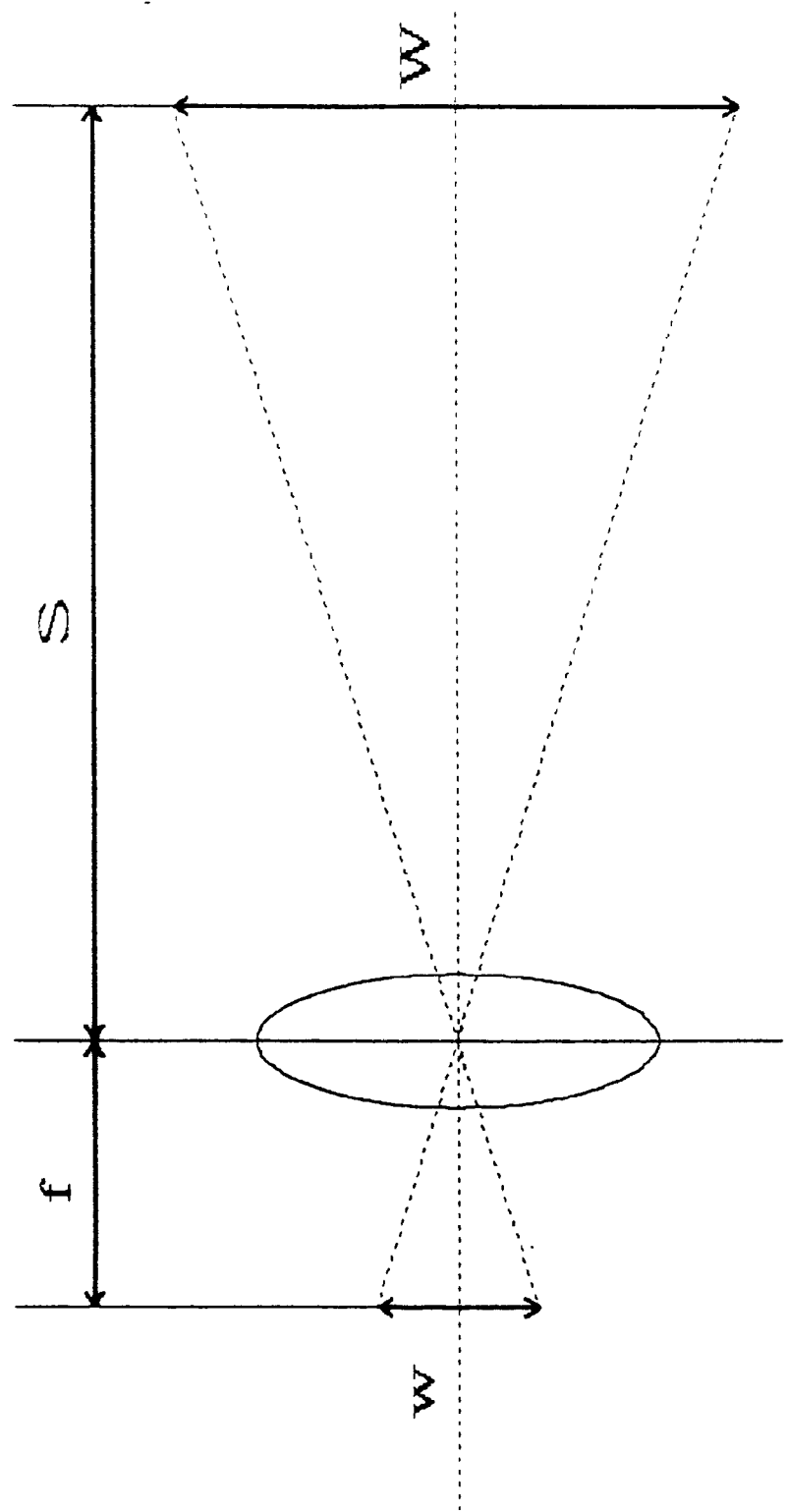
FIG. 9 is a diagrammatic representation of the principle of detection of the width of an object required to detect the white lines.

Next, on the principle of width detection shown in FIG. 9 the actual width W of the object is determined in step S23 in terms of the distance S, the image width w and the focal distance f of the lens by the following equation.

$$W = w \cdot S/f$$

A comparison is then made between the width W thus obtained and a predetermined width of white lines (step S24). When the comparison indicates that the width W is within the setting range of white lines, the point Pl or Pr of maximum is recognized as the position of a white line, and then output to the measuring range detector 8 (step S25).

The measuring range detector 8, which is a microcomputer-based circuit, recognizes white lines that define the traffic lane on which the distance-measuring-device-equipped vehicle is moving using the position of the white line and outputs the range defined by the white lines to the distance calculator 7 as a measuring range.

Figure 10:
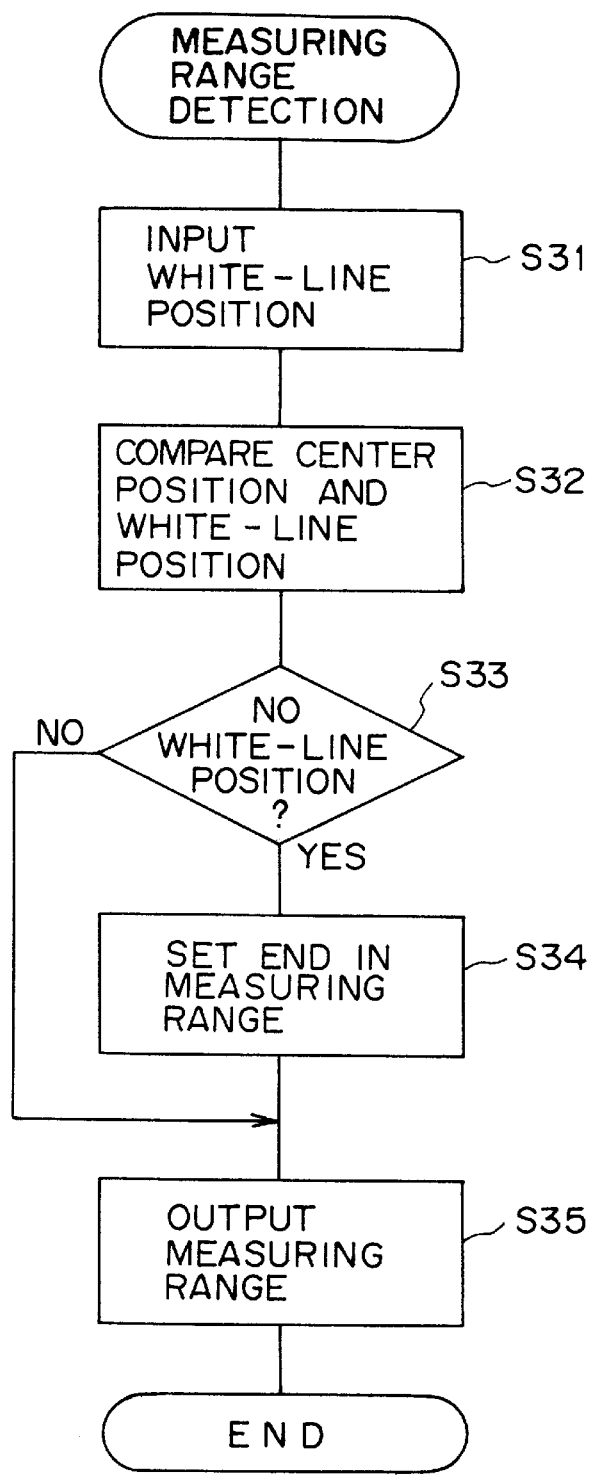
FIG. 10 is a flowchart for the operation of the measuring range detector of FIG. 1.
Figure 11:
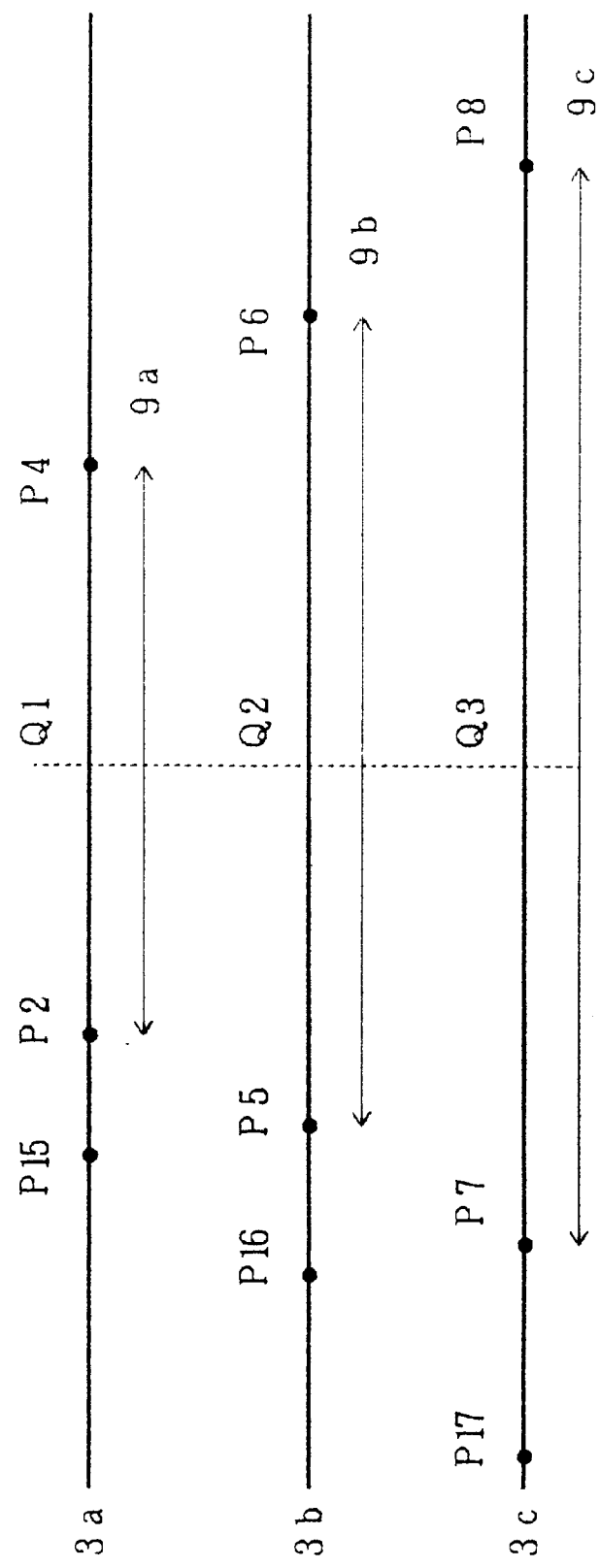
FIG. 11 is a diagram for explaining the detection of the measuring range.
Figure 12:
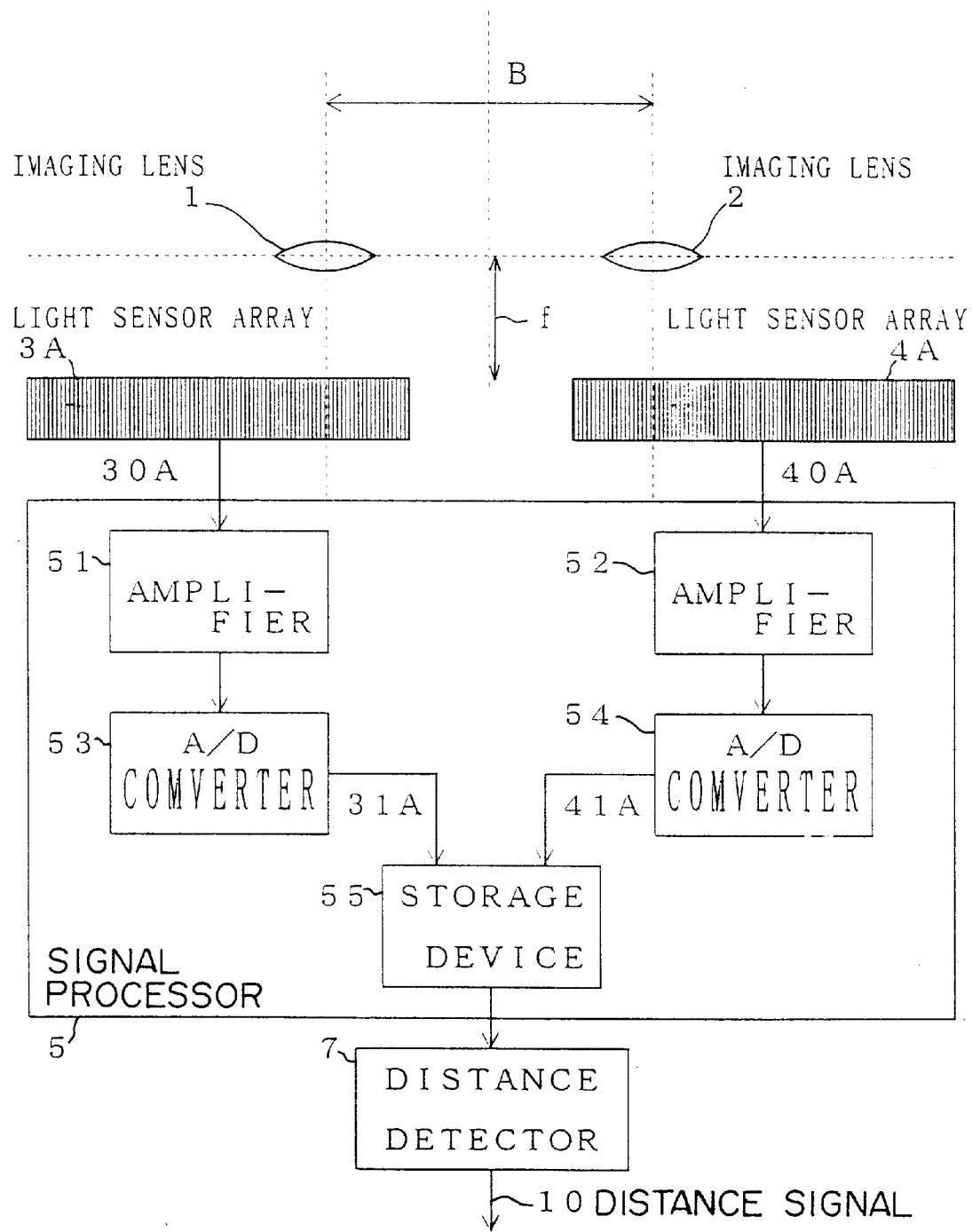
FIG. 12 shows an arrangement of a conventional vehicle interval measuring device.
Figure 13:
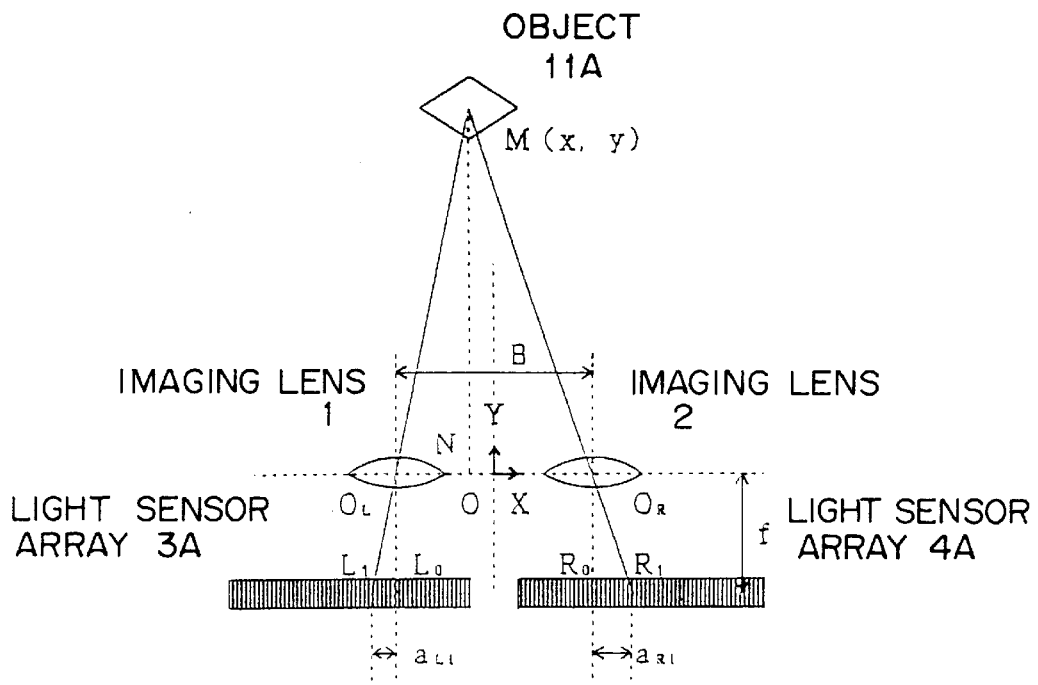
FIG. 13 is a diagram for explaining the principle of measuring the distance to a vehicle ahead.
Figure 14:
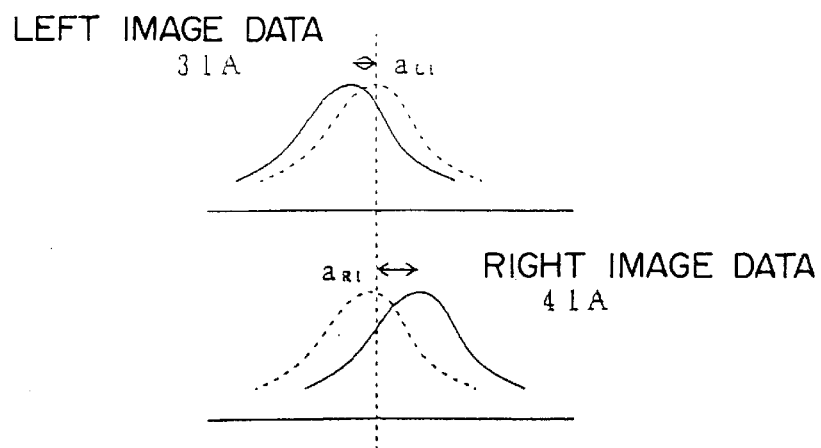
FIG. 14 illustrates right and left image data used for measuring the distance.
Figure 15:
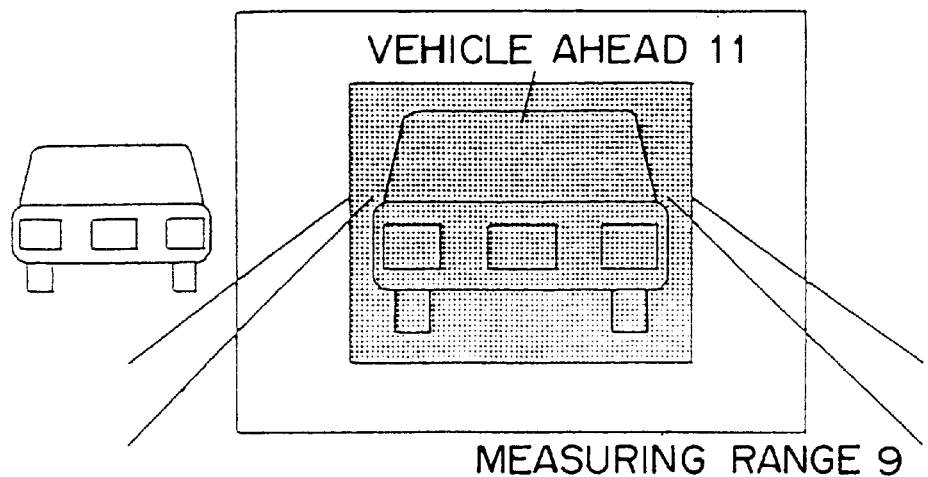
FIG. 15 illustrates a normal image at the time of detection of the distance to a vehicle ahead in the conventional device of FIG. 12.
Figure 16:
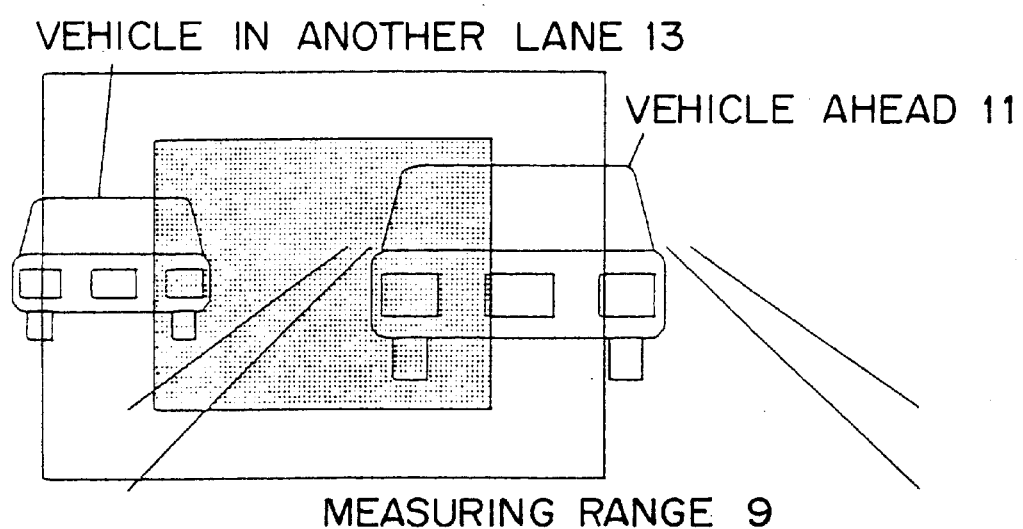
FIG. 16 illustrates an abnormal image at the time of detection of the distance to a vehicle ahead in the conventional device of FIG. 12.

Hereinafter, the operation of the measuring range detector 8 will be described with reference to FIGS. 10 and 11. FIG. 10 is a flowchart for the operation of the measuring range detector 8, and FIG. 11 is a diagram for explaining the measuring range detecting operation. In FIG. 11, P2, P4 to P8, and P15 to P17 represent points of maximum value on the light sensor arrays 3a, 3b and 3c.

The measuring range detector 8 receives the points P2, P4 to P8 and P15 to P17 of maximum values which indicate the positions of white lines (step S31), compares the positions of maximum values on each of the sensor arrays 3a, 3b and 3c with respective center points Q1, Q2 and Q3 of the sensor arrays, and then recognizes the points P2 and P4 to P8 which are each closest to the corresponding center point on each side as white lines 12 that define the lane on which the associated vehicle is moving (step S32). After that, measuring range signals 9a, 9b and 9c each representing the area between the white-line positions thus obtained on the corresponding sensor array are output to the distance detector 7 (step S35).

If there is no white-line position to the left or right of the center point (Q1, Q2, or Q3) of a sensor array (YES in step S33), then the left or right end of the sensor array (3a, 3b, or 3c) is set as the left or right end of the measuring range (step 34). The distance detector 7 calculates the distance to an object using the image within the measuring ranges on the basis of above-described principle of distance measurement and outputs a distance signal 10.

The white-line detector 6, the distance detector 7 and the measuring range detector 8 in the embodiment have been described as being functionally separate components; however, in practice, they can be implemented by a single microcomputer-based circuit. Although, in the embodiment, the measuring ranges have been described as being determined by white lines, the present invention is adaptable to other types of lines such as yellow lines.

According to the invention, white lines defining traffic lanes are detected first by the white-line detector, and then horizontal position ranges where a car ahead may be moving are detected by the measuring range detector. Finally, the distance to the car ahead is calculated by the distance detector on the basis of triangulation using the positions in which the car ahead is imaged within the detected position ranges. Therefore, even if the imaged leading car's position shifts in places such as curves, the distance to that car can be detected stably and accurately. The determination of white lines defining a traffic lane is made by the white-line detector on the basis of maximum values in the distribution of quantity of light on light sensor arrays; thus, less time is required for signal processing because image processing required with the automatic tracking system becomes unnecessary. Furthermore, the signal processing circuit can be simple in construction, increasing reliability and lowering cost.

What is claimed is:

1. A device for determining the distance between one vehicle traveling in a traffic lane defined by a lane line and a vehicle ahead also traveling in said traffic lane, comprising:

a pair of light receivers each having a light sensor array;

line detecting means for determining the position of the lane line by detecting an image at a maximum point in a distribution of a quantity of light on said light sensor array of at least one of said pair of light receivers, and providing an output signal representing a position of the lane line, said output signal being based on only said maximum point;

measuring range detecting means responsive to said output signal of said line detecting means for detecting the width of the traffic lane; and distance detecting means for determining the distance to said vehicle ahead on the basis of a position where an image of said vehicle ahead is formed on said light sensor array within a range of said traffic lane detected by said measuring range detecting means, wherein said distance detecting means disregards objects outside of said range of said traffic lane.

2. The device according to claim 1, wherein said line detecting means determines a detected image as the lane line if the maximum point is maintained within a predetermined length of time.

3. The device according to claim 1, wherein at least one of said light receivers comprises at least separate first, second and third light sensor arrays, and wherein the position of the lane line is determined when a straight line connecting points of maximum value in a distribution of quantity of light on said first and second light sensor arrays passes within a predetermined range centered at a point of maximum value in a distribution of quantity of light on said third light sensor array.

4. The device according to claim 1, wherein said line detecting means detects the lane line by determining the distance to an object using a position of a maximum point in the distribution of quantity of light on said light sensor array of said light receivers and a width of an image of said object on said light sensor array.

5. The device according to claim 4, wherein said line detecting means determines a width of said object by using the distance to said object and the width of said image of said object and detects said object as said line when the width of said object is smaller than a predetermined width.

6. The device according to claim 1, wherein the lane line is a white line.

7. The device according to claim 1, wherein said measuring range detecting means determines the width of the traffic lane on the basis of a line closest to said light sensor arrays among a plurality of lines detected by said line detecting means.

8. A device for detecting a lane line marking the boundary of a lane on a road, comprising;
   a light receiver having separate first light sensor array, second light sensor array, and third light sensor array; and
   line detecting means detecting a straight line that connects only a point of maximum value in a distribution of quantity of light on said first light sensor array and only a point of maximum value in a distribution of quantity of light on said second light sensor array, and detecting an image of the straight line as the lane line when the straight line passes within a predetermined range centered only at a point of maximum value in a distribution of quantity of light on said third light sensor array.

9. A device for detecting a lane line on a road, comprising:
   a light receiver having a light sensor array; and
   line detecting means determining a distance to an object by using a position of only a maximum point in the distribution of a quantity of light on said light sensor array and a width of an image of said object on said light sensor array, determining a width of said object using the distance to said object and the width of said image of said object, and detecting said object as the lane line when the width of said object is within a predetermined range.

10. A method for determining the distance between one vehicle moving in a traffic lane defined by a lane line and a vehicle ahead also moving in said traffic lane, including:
    first step of detecting an image at a maximum point in a distribution of a quantity of light on a light sensor array as the lane line;
    second step of providing a signal representing the position of the lane line based on only said maximum point;
    third step of determining a width of the traffic lane using said signal; and
    fourth step of determining the distance to said vehicle ahead on the basis of a position where an image of the preceding vehicle is formed on said light sensor array within a range of the traffic lane, wherein objects outside of said range of the traffic lane are disregarded.

11. The method according to claim 10, wherein said image is detected as said line in said first step when said image is maintained within a predetermined range for a predetermined length of time.

12. The method according to claim 10, wherein when a straight line that connects a point of maximum value in a distribution of quantity of light on separate first light sensor array and a point of maximum value in a distribution of quantity of light on separate second light sensor array, passes within a predetermined range centered at a point of maximum value in a distribution of quantity of light on separate third light sensor array, an image corresponding to the straight line is detected as said line in said first step.

13. The method according to claim 10, wherein said first step includes a step of determining a distance to an object using a position of a maximum point in the distribution of quantity of light on said light sensor array and a width of an image of said object on said light sensor array and a step of detecting said lane line using the distance to said object and the width of said image of said object.

14. The method according to claim 13, wherein said first step further includes a step of determining a width of said object using the distance to said object and the width of said image of said object and a step of detecting said object as said line when the width of said object is in a predetermined range.

15. The method according to claim 10, wherein the lane line is a white line.

16. The method according to claim 10, wherein said third step includes a step of determining the width of the traffic lane on the basis of said position of the lane line on said light sensor array.

17. A method for detecting a lane line on a road, including steps of:
    determining a straight line that connects corresponding points of only maximum value in a distribution of quantity of light on a first light sensor array and a second light sensor array; and
    identifying an image of the straight line as the lane line when the straight line passes within a predetermined range centered at a point of maximum value in a distribution of quantity of light on a third light sensor array.

18. A method for detecting a lane boundary line on a road, including steps of:
    determining a distance to an object using only a position of a maximum point in the distribution of quantity of light on a light sensor array and a width of an image of said object on said light sensor array;
    determining a width of said object using the distance to said object and the width of said image of said object; and
    detecting said object as the lane boundary line when the width of said object is within a predetermined range.

19. A device for determining the distance between one vehicle moving in a traffic lane defined by a lane line and a vehicle ahead also moving in said traffic lane, comprising:
    a pair of light receivers each having a plurality of light sensor arrays, said plurality of light sensor arrays in each of said pair of light receivers being formed in parallel;
    line detecting means for determining the position of the lane line by detecting an image at a maximum point in a distribution of a quantity of light on at least one of said plurality of light sensor arrays of at least one of said pair of light receivers, and providing an output signal representing the position of the lane line, said output signal based on only said maximum point;
    measuring range detecting means responsive to said output signal of said line detecting means for detecting a width of the traffic lane; and
    distance detecting means for determining the distance to said vehicle ahead on the basis of a position where an image of said vehicle ahead is formed on said plurality of light sensor arrays within a range of said traffic lane detected by said measuring range detecting means, wherein said distance detecting means disregards objects outside of said range of said traffic lane.

* * * * *

UNITED STATES PATENT AND TRADEMARK OFFICE
CERTIFICATE OF CORRECTION

PATENT NO.     : 5,929,784
DATED          : July 27, 1999
INVENTOR(S)    : Kawaziri et al.

It is certified that error appears in the above-identified patent and that said Letters Patent is hereby corrected as shown below:

Item [57] Abstract,
Please delete the existing Abstract in its entirety and insert -- A device for determining the distance between vehicles includes one vehicle ahead of a device-equipped vehicle moving on a traffic lane defined by lines drawn on a road. The device has a pair of light receivers with a light sensor array and a line detector for detecting images at a maximum quantity of light. The position of the maximum value of light is transmitted as an output signal representing the positions of lane lines. A measuring range detector is responsive to the output signal of the line detector for detecting a lane of positions for the traffic lane on which the device-equipped vehicle is moving. A distance detector determines the distance to the vehicle ahead on the basis of the position of an image of the vehicle ahead formed on the light sensor array within the range of the traffic lane detected by the measuring range detector. -- therefor;

Column 1,
Line 63, delete "$a_{R1}.y$" and insert -- -$a_{R1}.y$ -- therefor

Column 2,
Line 64, after "said" insert -- light receivers, --
Line 65, delete "receivers, light"

Column 9,
Line 4, delete "said line" and insert -- the lane -- therefor
Line 54, delete "said line" and insert -- the lane line -- therefor
Line 59, before "separate" insert -- a --
Line 61, before "separate" insert -- a --
Line 63, before "separate" insert -- a --

UNITED STATES PATENT AND TRADEMARK OFFICE
CERTIFICATE OF CORRECTION

PATENT NO. : 5,929,784
DATED : July 27, 1999
INVENTOR(S) : Kawaziri et al.

It is certified that error appears in the above-identified patent and that said Letters Patent is hereby corrected as shown below:

<u>Column 10,</u>
Line 4, delete "said line" and insert -- the lane line -- therefor
Line 10, delete "said line" and insert -- the lane -- therefor Signed and Sealed this Eleventh of December, 2001

*Attest:*

*Attesting Officer*

NICHOLAS P. GODICI
*Acting Director of the United States Patent and Trademark Office*